(12) United States Patent
Laski

(10) Patent No.: US 7,473,019 B2
(45) Date of Patent: Jan. 6, 2009

(54) LIGHTING APPARATUS

(75) Inventor: Joseph John Laski, Stoneham, MA (US)

(73) Assignee: Osram Opto Semiconductors GmbH, Regensburg (DE)

( * ) Notice: Subject to any disclaimer, the term of this patent is extended or adjusted under 35 U.S.C. 154(b) by 0 days.

(21) Appl. No.: 11/239,718

(22) Filed: Sep. 29, 2005

(65) Prior Publication Data

US 2007/0070623 A1    Mar. 29, 2007

(51) Int. Cl.
F21V 19/04    (2006.01)

(52) U.S. Cl. .................... 362/612; 362/308; 362/613

(58) Field of Classification Search ............. 362/612, 362/227, 234, 235, 236, 240, 244, 245, 800, 362/249

See application file for complete search history.

(56) References Cited

U.S. PATENT DOCUMENTS

| | | | |
|---|---|---|---|
| 3,875,532 A * | 4/1975 | Kobayashi et al. ............ | 372/92 |
| 4,630,180 A | 12/1986 | Muraki et al. | |
| 4,847,734 A | 7/1989 | Katoh et al. | |
| 5,365,411 A * | 11/1994 | Rycroft et al. ................ | 362/20 |
| 5,453,855 A | 9/1995 | Nakamura et al. | |
| 6,536,914 B2 * | 3/2003 | Hoelen et al. ................ | 362/231 |
| 6,812,500 B2 | 11/2004 | Reeh et al. | |
| 6,951,401 B2 * | 10/2005 | Van Hees, deceased et al. .. | 362/612 |
| 6,964,497 B2 * | 11/2005 | Greiner ...................... | 362/241 |

FOREIGN PATENT DOCUMENTS

| | | |
|---|---|---|
| EP | 0364228 A2 | 4/1990 |
| JP | 0203230 A | 2/1990 |
| WO | WO 97/50132 | 12/1997 |
| WO | WO03/062700 A1 | 7/2003 |
| WO | WO2004/111532 A1 | 12/2004 |

OTHER PUBLICATIONS

OSRAM Data Sheet, LINEARlight, OS-LM01A, Mar. 1, 2005.
Product Bulletin 3635-100, "3M Light Enhancement Film 3635-100", Release C, Jun. 2000.

* cited by examiner

*Primary Examiner*—Anabel M Ton
(74) *Attorney, Agent, or Firm*—Cohen Pontani Lieberman & Pavane LLP

(57) ABSTRACT

A lighting apparatus, particularly for the use as lighting elements in signage or as backlighting apparatus, which comprises a cavity formed by a light emitting front side, a reflective backside arranged opposite to the front side and a sidewall, and a plurality of light emitting semiconductor components mounted on the sidewall in such a way that their light is irradiated in the cavity. The reflective backside of the cavity is formed in such a way that the cavity is divided into at least two partitions directing the light to the front side.

13 Claims, 2 Drawing Sheets

LIGHTING APPARATUS

FIELD OF THE INVENTION

The present invention relates to a lighting apparatus.

BACKGROUND OF THE INVENTION

For lighting elements, for example for use in signage or as backlighting apparatus of displays, in particular of liquid crystal displays (LCD-displays), lighting apparatus providing a light emitting surface with a homogeneous light distribution are required. Furthermore, thin and light-weight lighting apparatus are required to obtain thin and light-weight lighting elements.

SUMMARY OF THE INVENTION

One object of the invention is to provide a lighting apparatus with a light emitting front side with a homogeneous light distribution. A further object of the invention is to provide a thin lighting apparatus.

These objects are attained in accordance with one aspect of the invention directed to a lighting apparatus that comprises a cavity formed by a light emitting front side, a reflective backside arranged opposite to the front side and a sidewall. A plurality of light emitting semiconductor components are mounted on the sidewall in such a way that their light is irradiated in the cavity. The reflective backside is formed such that the cavity is divided into at least two partitions directing the light to the front side.

In contrast to a lighting apparatus with "direct back lighting", which comprises semiconductor components arranged in a plane parallel to the light emitting front side of the lighting apparatus, a lighting apparatus with sidewise arranged semiconductor components, as described above, allows for a decreased thickness. Compared to a lighting apparatus with semiconductor components emitting radiation in the sidewall of a solid waveguide, a lighting apparatus with semiconductor components emitting radiation in the sidewall of a cavity has a lower weight and is easier to realize, since engineering of the waveguide material regarding its light-guiding and light-scattering properties with respect to the desired geometry of the light emitting front side of the lighting apparatus is made superfluous.

The semiconductor components each comprise at least one semiconductor body with an active layer sequence based on a semiconductor material. The active layer sequence is suited to generate electromagnetic radiation, in particular visible light. The active layer sequence of the semiconductor body is for example epitaxially grown and preferably comprises a pn-junction, a double hetero structure, a single quantum well structure or a multi quantum well structure for the generation of electromagnetic radiation. The term "quantum well structure" refers to any structure which quantizes the energy levels of charge carriers by means of confinement. In particular, the term "quantum well structure" does not include any specification about the dimension of the quantization and refers for example to quantum wells, quantum wires and quantum dots as well as any combination of these structures.

Preferably, the semiconductor components emit white light during operation. For the generation of white light, each semiconductor component can comprise several semiconductor bodies emitting light of different colors, for example red, green and blue, which is mixed in such a way that the semiconductor components emit white light. Alternatively, each semiconductor component can comprise only one semiconductor body and a wavelength converting material, which converts part of the radiation emitted by the semiconductor body into radiation of different wavelengths in such a way that the semiconductor component emits mixed polychromatic light comprising converted and non-converted light. Light emitting semiconductor components with wavelength converting material are described in U.S. Pat. No. 6,576,930 the content of which is hereby incorporated by reference.

Preferably, the sidewall extends from the front side to the backside.

In a preferred embodiment, surface-mounted light emitting diodes (SMD-LEDs) are used as semiconductor components. This has the advantage that the semiconductor components can be mounted directly on the sidewall.

In a further preferred embodiment, the sidewall is formed by a printed circuit board (PCB). This has the advantage that the semiconductor components can be mounted directly on the printed circuit boards and can, for example, be easily electrically connected via circuit paths on the printed circuit boards. Moreover, the printed circuit boards can advantageously comprise further electronic components for controlling the semiconductor components.

In a further preferred embodiment, the lighting apparatus comprises at least one optical element, which is optically connected to the semiconductor components. The optical element forms the angular distribution of the radiation of the semiconductor components preferably in such a way that their light is directed to a central zone of the cavity. As an optical element, a cylindrical lens, such as a transparent rod, can be used.

In a further preferred embodiment, a plurality of semiconductor components is optically connected to the same optical element, such as a transparent rod. This reduces the number of mounting steps of the lighting apparatus advantageously.

Furthermore, the surface of the backside adjacent to the cavity of the lighting apparatus is preferably diffusely reflective. By means of a diffusely reflective backside, the light emitted by the semiconductor components can be directed to the front side in a homogeneously distributed manner.

In a preferred embodiment, the lighting apparatus has a V-shaped backside dividing the cavity almost symmetrically into two partitions, which are connected by a small gap located in a central region of the cavity. The term "V-shaped backside" means that part of each half of the backside is inclined towards its adjacent sidewall in the direction of the front side in such a way that a bend is formed at the middle of the backside. Preferably, a small gap between backside and front side remains at the location of the bend. The small gap avoids a dark shadow line in the central region of the light emitting front side and thus contributes to a homogeneous light distribution of the lighting apparatus.

In particular, the term "V-shaped" includes a backside wherein each half of the backside is a flat plane inclined towards its adjacent sidewall by the same angle. Furthermore, the term "V-shaped" includes a backside wherein each half of the backside has an S-shaped profile inclined against its adjacent sidewall. The term "V-shaped" also includes a wing-shaped backside wherein each half of the backside has a convex profile inclined against its adjacent sidewall.

The front side of the lighting apparatus can be formed by a translucent or a transparent plate. A translucent plate, in particular, has the advantage that the plate scatters the light of the light emitting semiconductor components and thus contributes to a homogeneous light distribution of the front side. Preferably, the front side is formed by an acrylic plate.

In one preferred embodiment, the lighting apparatus has a side length ≧ 100 mm and comprises a maximum of 24 light emitting semiconductor components.

Preferably, the lighting apparatus is used in a display, such as an LCD-display, for backlighting or in a signage as light element.

DETAILED DESCRIPTION OF THE DRAWINGS

Figure 1A:
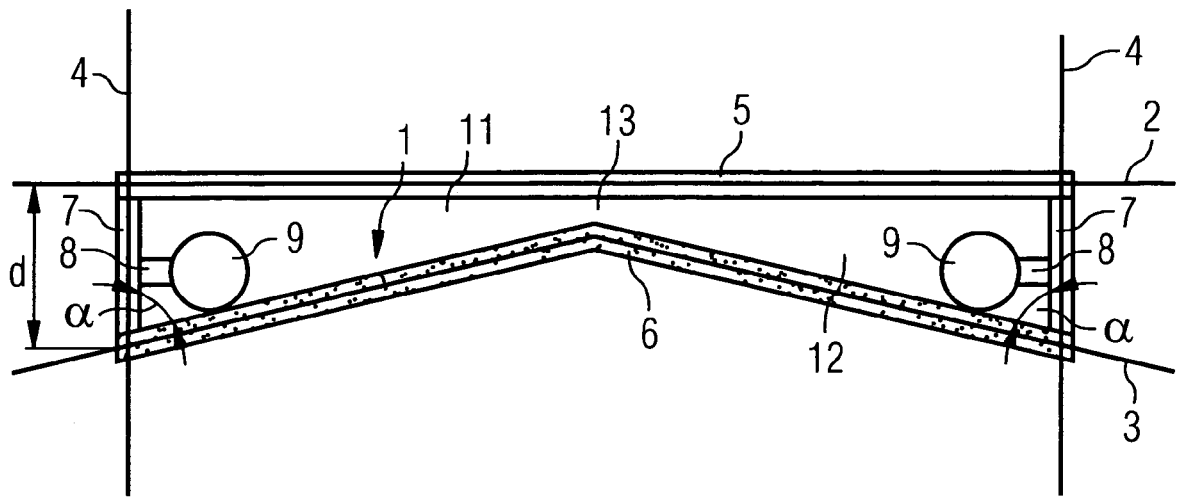
FIG. 1A shows a schematic cross-sectional view of a lighting apparatus according to a first embodiment of the invention.

The lighting apparatus according to the embodiment of FIG. 1A comprises a cavity 1 formed by a light emitting front side 2, a backside 3 and two sidewalls 4. The front side 2 is formed by an acrylic translucent plate 5 with a thickness of about 3 mm (about 0.12 inches), which diffusely emits light. The backside 3 is V-shaped in such a way that each half of the backside 3 is a flat plane inclined toward its adjacent sidewall 4 by the same angle α. The V-shaped backside 3 symmetrically divides the cavity 1 into two equal partitions 11, 12 connected by a small gap 13 between the front side 2 and the backside 3 in the central region of the cavity 1. The backside 3 of the lighting apparatus is formed by an opaque reflecting plate 6 with a diffusely reflecting surface 61 adjacent to the cavity 1. As opaque reflector plate 6, a mirror finished aluminum sheet with a thickness of about 4 mm (about 1/16 inches) is used. In order to obtain a diffusely reflecting surface 61, the aluminum sheet is covered with a diffusely reflective film (for example the light enhancement film 3635-100 of 3M).

Figure 1B:
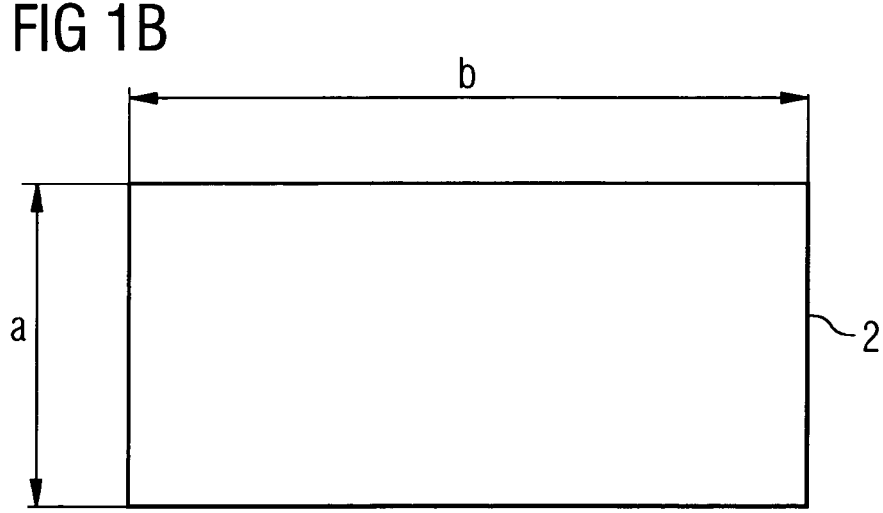
FIG. 1B shows a schematic top view of the lighting apparatus of FIG. 1A.

As shown in FIG. 1B, the lighting apparatus has a rectangular light emitting front side 2 with a length a of about 127 mm (about 5 inches) and a width b of about 178 mm (about 7 inches). The thickness d (FIG. 1A) of the lighting apparatus is about 13 mm (about 0.5 inches).

Figure 2:
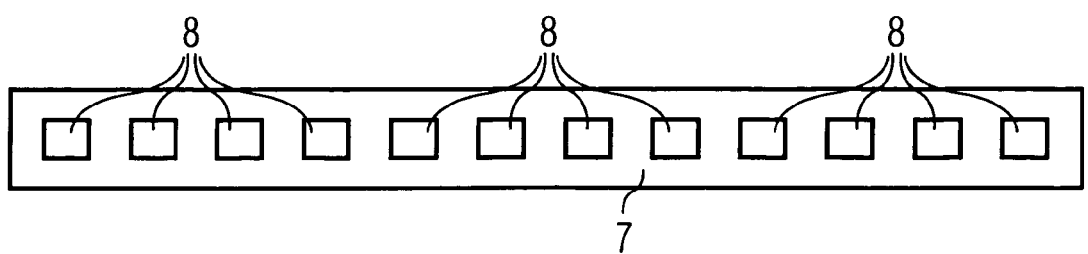
FIG. 2 shows a schematic top view of a sidewall of the lighting apparatus with semiconductor components according to a first embodiment of the invention.

Each sidewall 4 of the lighting apparatus is formed by a strip-shaped printed circuit board 7. As light emitting semiconductor components, twelve SMD-LEDs 8 emitting white light are mounted equally spaced on the printed circuit board 7, as shown in FIG. 2 (for example LINEARlight of OSRAM). The SMD-LEDs 8 are electrically connected to circuit paths on the circuit board 7 (not shown). On the light emitting front side of the SMD-LEDS 8 of each sidewall 4, an acrylic rod 9 with a diameter of about 95 mm (about 3/8 inch) is mounted as optical element in such a way that the acrylic rod 9 is optically connected to the SMD-LEDs 8. The acrylic rod 9 serves as a cylindrical lens for each SMD-LED 8 and directs their light to a central portion of the cavity 1.

Figure 3:
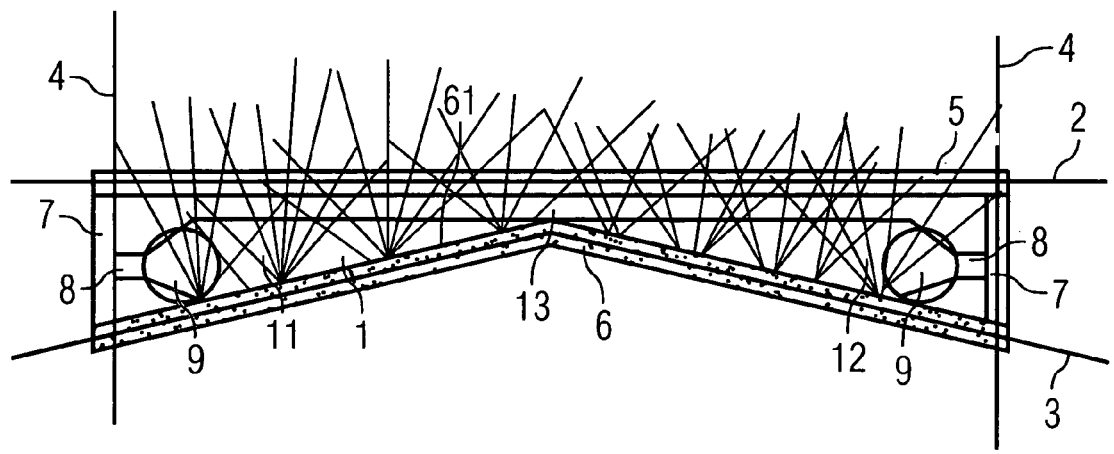
FIG. 3 shows a schematic cross-sectional view of the light distribution within the cavity of the lighting apparatus of FIG. 1A.

As shown in FIG. 3, the acrylic rod 9 optically connected to the twelve SMD-LEDs 8 of one sidewall 4 condenses the angular distribution of the SMD-LEDs 8 in order to direct the light to the central region of the cavity 1 to avoid that a main portion of the light emitted by the SMD-LEDs 8 is irradiated from the outer regions of the front side 2. In order to avoid further that the light condensed by the cylindrical rod 9 passes through the cavity 1 and is absorbed by the opposite sidewall 4 and in particular by the SMD-LEDs 8 mounted to this sidewall 4, the backside 3 is V-shaped, as described above in connection with FIG. 1A. Each half of the backside 3 inclined towards its adjacent sidewall 4 directs the light emitted by the SMD-LEDs 8 mounted on this sidewall 4 to the front side 2. By means of the diffusely reflecting surface 61 of the backside 6, the light is additionally scattered to obtain a homogeneous light distribution. The average luminance of the light emitting front side 2 of the lighting apparatus according to FIGS. 1A, 1B, 2 and 3 is about 200 cd/m$^2$.

Figure 4:
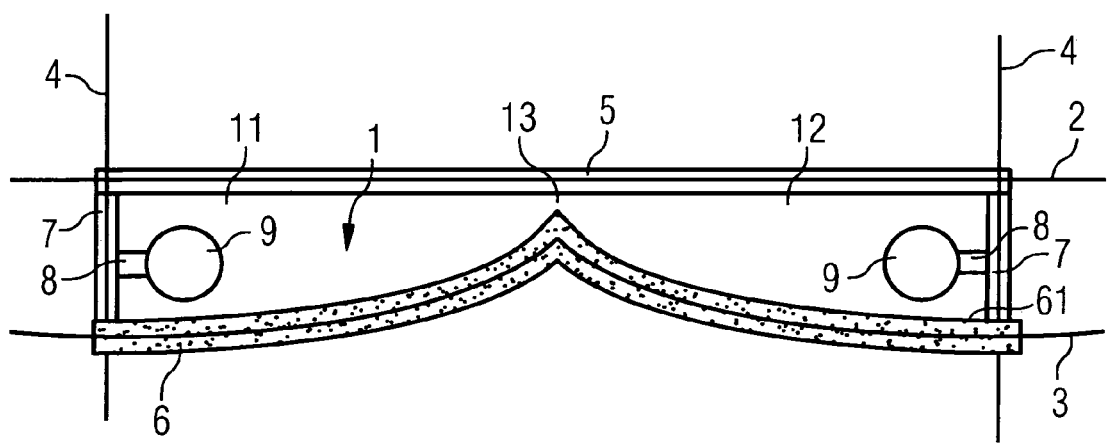
FIG. 4 shows a schematic cross-sectional view of the lighting apparatus according to a second embodiment of the invention.

Unlike the lighting apparatus according to the embodiment of FIG. 1A, the lighting apparatus according to the embodiment of FIG. 4 has a wing-shaped backside 3, wherein each half of the backside 3 has a convex profile inclined toward its adjacent sidewall 4.

Figure 5:
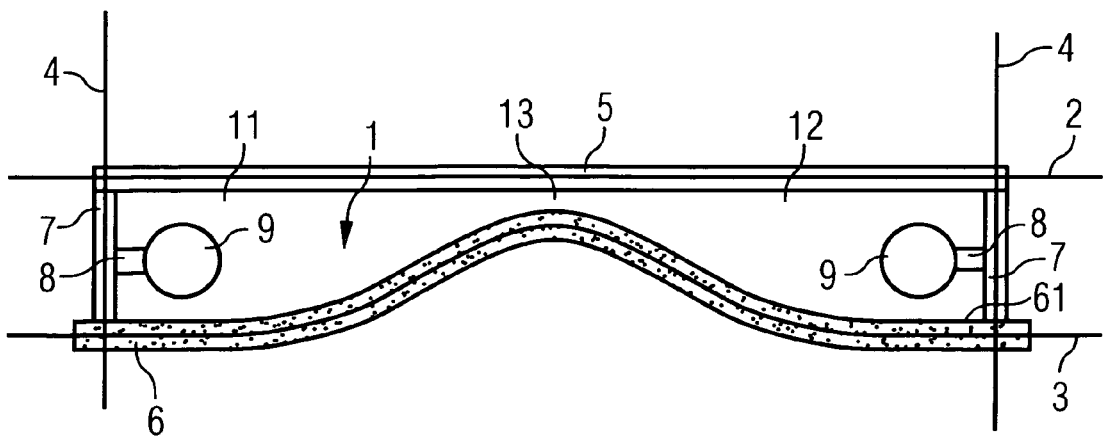
FIG. 5 shows a schematic cross-sectional view of the lighting apparatus according to a third embodiment of the invention.

Unlike the lighting apparatus according to the embodiment of FIG. 1A and the embodiment of FIG. 4, the lighting apparatus according to the embodiment of FIG. 5 has a backside 3 wherein each half of the backside 3 has an S-shaped profile inclined toward its adjacent sidewall 4.

The scope of the invention is not limited to the examples given herein above. The invention is embodied in each novel characteristic and each combination of characteristics, which particularly includes any combination of the features which are described in the claims, even if these features or this combination of features is not explicitly referred to in the claims or in the examples.

I claim:

1. A lighting apparatus comprising:
   a cavity formed by a light emitting front side,
   a reflective backside arranged opposite to the front side and a sidewall, and
   a plurality of light emitting semiconductor components disposed completely within the cavity and mounted on the sidewall in such a way that the light of the plurality of light emitting semiconductor components is irradiated in the cavity,
   wherein the reflective backside is formed in such a way that the cavity is divided into at least two portions directing the light to the front side, and
   wherein at least one optical element in the form of a cylindrical lens is optically connected to the semiconductor components.

2. The lighting apparatus according to claim 1, wherein the semiconductor components are surface-mounted light emitting diodes (SMD-LEDs).

3. The lighting apparatus according to claim 1, wherein the sidewall is formed by a printed circuit board.

4. The lighting apparatus according to claim 1, wherein the sidewall extends from the front side to the backside.

5. The lighting apparatus according to claim 1, wherein the plurality of semiconductor components is optically connected to the same one of the at least one optical element.

6. The lighting apparatus according to claim 1, wherein the surface of the backside adjacent to the cavity is diffusely reflective.

7. The lighting apparatus according to claim 1, wherein the backside has a V-shape symmetrically dividing the cavity into two partitions being connected by a small gap located in a central region of the cavity.

8. The lighting apparatus according to claim 1, wherein the front side is formed by a translucent or transparent plate.

9. The lighting apparatus according to claim 1 with a side length ≧100 mm comprising a maximum of 24 light emitting semiconductor components.

10. A display comprising the lighting apparatus according to claim 1 for backlighting.

11. A signage comprising the lighting apparatus according to claim 1.

12. A lighting apparatus comprising:
a cavity formed by a light emitting front side,
a reflective backside arranged opposite to the front side and a sidewall, the reflective backside being formed in such a way that the cavity is divided into at least two portions directing the light to the front side,
a plurality of light emitting semiconductor components mounted on the sidewall in such a way that the light of the plurality of light emitting semiconductor components is irradiated in the cavity, and
at least one optical element in the form of a cylindrical lens optically connected to the semiconductor components, wherein the at least one optical element forms an angular distribution of the radiation of the light emitting semiconductor components in such a way that the light is directed to a central zone of the cavity,
wherein the plurality of light emitting semiconductor components is optically connected to the same one of the at least one optical element.

13. The lighting apparatus according to claim 12 wherein the light emitting semiconductor components are disposed completely within the cavity.

* * * * *